(12) United States Patent
Amicangioli et al.

(10) Patent No.: US 11,228,529 B1
(45) Date of Patent: Jan. 18, 2022

(54) LOCAL AND GLOBAL QUALITY OF SERVICE SHAPER ON INGRESS IN A DISTRIBUTED SYSTEM

(71) Applicant: HYANNIS PORT RESEARCH, INC., Needham, MA (US)

(72) Inventors: Anthony D. Amicangioli, Newton, MA (US); Allen Bast, Sharon, MA (US); B. Joshua Rosen, Westford, MA (US)

(73) Assignee: HYANNIS PORT RESEARCH, INC., Needham, MA (US)

( * ) Notice: Subject to any disclaimer, the term of this patent is extended or adjusted under 35 U.S.C. 154(b) by 0 days.

(21) Appl. No.: 16/988,212

(22) Filed: Aug. 7, 2020

(51) Int. Cl.
| | |
|---|---|
| H04L 12/26 | (2006.01) |
| H04L 12/801 | (2013.01) |
| H04L 12/803 | (2013.01) |
| G06Q 40/04 | (2012.01) |
| G06Q 30/08 | (2012.01) |
| H04L 12/863 | (2013.01) |

(52) U.S. Cl.
CPC .......... *H04L 47/193* (2013.01); *G06Q 30/08* (2013.01); *G06Q 40/04* (2013.01); *H04L 47/122* (2013.01); *H04L 47/6225* (2013.01)

(58) Field of Classification Search
None
See application file for complete search history.

(56) References Cited

U.S. PATENT DOCUMENTS

| | | |
|---|---|---|
| 6,697,331 B1 | 2/2004 | Riihinen et al. |
| 7,023,833 B1 | 4/2006 | Aiello et al. |
| 7,496,086 B2 | 2/2009 | Eckberg et al. |
| 7,720,043 B2 | 5/2010 | Meylan et al. |
| 7,876,740 B2 | 1/2011 | Eastwood et al. |
| 7,876,751 B2 | 1/2011 | Benner et al. |
| 7,885,296 B2 | 2/2011 | Biederman et al. |

(Continued)

FOREIGN PATENT DOCUMENTS

| | | |
|---|---|---|
| EP | 1968275 A1 | 9/2008 |
| JP | 2019050013 A | 3/2019 |

(Continued)

OTHER PUBLICATIONS

"Configuring Queuing and Flow Control," Cisco Nexus 5000 Series NX-OS Quality of Service Configuration Guide, Release 5.2(1)N1(1).

(Continued)

*Primary Examiner* — Zewdu A Beyen
(74) *Attorney, Agent, or Firm* — VLP Law Group LLP; David J. Thibodeau, Jr.

(57) ABSTRACT

A distributed computing system, such as may be used to implement an electronic trading system, controls inbound message flow rates. Limiting a per-client or per-connection inbound message rate also helps ensure fair provisioning of computing resources, so that a single client's excessive use of resources cannot overwhelm the system to such an extent that it prevents other clients from interacting with the distributed system. It is also desirable to have system-wide control of the overall inbound message rate across all client connections. Such system-wide control ensures that the distributed system as a whole can maintain the required levels of service, including offering a predictable level of access for all clients.

23 Claims, 8 Drawing Sheets

(56) References Cited

U.S. PATENT DOCUMENTS

| | | | |
|---|---|---|---|
| 7,948,883 B1* | 5/2011 | Croft, Jr. | H04L 47/12 |
| | | | 370/230 |
| 8,923,341 B2 | 12/2014 | Barnette et al. | |
| 9,691,102 B2 | 6/2017 | Studnitzer et al. | |
| 9,712,606 B2 | 7/2017 | Färnlöf et al. | |
| 9,929,743 B1 | 3/2018 | Acuna-Rohter et al. | |
| 10,104,148 B2 | 10/2018 | Yang et al. | |
| 10,262,365 B2 | 4/2019 | Venkataraman | |
| 10,417,709 B2 | 9/2019 | Hosman et al. | |
| 10,467,693 B2 | 11/2019 | Studnitzer et al. | |
| 10,504,183 B2 | 12/2019 | Venkataraman | |
| 10,585,729 B2 | 3/2020 | Vaccaro | |
| 10,637,967 B2 | 4/2020 | Bonig | |
| 10,699,336 B2 | 6/2020 | Burkhardt et al. | |
| 2003/0065974 A1 | 4/2003 | Lam | |
| 2003/0235209 A1* | 12/2003 | Garg | H04L 12/4675 |
| | | | 370/468 |
| 2004/0215753 A1 | 10/2004 | Chan et al. | |
| 2004/0246897 A1* | 12/2004 | Ma | H04L 47/10 |
| | | | 370/230 |
| 2007/0255855 A1 | 11/2007 | Knapp et al. | |
| 2008/0069118 A1 | 3/2008 | Monier | |
| 2008/0084833 A1 | 4/2008 | Picard | |
| 2010/0046368 A1* | 2/2010 | Kaempfer | H04L 47/10 |
| | | | 370/231 |
| 2010/0318673 A1 | 12/2010 | Kemp et al. | |
| 2011/0194409 A1 | 8/2011 | Ofelt et al. | |
| 2011/0264577 A1 | 10/2011 | Winbom | |
| 2012/0044940 A1 | 2/2012 | Katz et al. | |
| 2012/0093022 A1 | 4/2012 | Wang | |
| 2012/0131221 A1 | 5/2012 | Foygel et al. | |
| 2012/0195203 A1 | 8/2012 | Godbole et al. | |
| 2012/0317011 A1 | 12/2012 | Duquette | |
| 2015/0081508 A1 | 3/2015 | Schwall et al. | |
| 2015/0195202 A1 | 7/2015 | Ogura | |
| 2015/0341422 A1 | 11/2015 | Farnlof | |
| 2015/0356679 A1 | 12/2015 | Schmitt | |
| 2016/0028637 A1 | 1/2016 | Vasseur et al. | |
| 2016/0063628 A1 | 3/2016 | Kreider et al. | |
| 2016/0119080 A1 | 4/2016 | Gineste | |
| 2016/0294921 A1 | 10/2016 | Meng | |
| 2017/0127341 A1 | 5/2017 | Di Marco | |
| 2017/0236203 A1 | 8/2017 | Amicangioli | |
| 2018/0167492 A1 | 6/2018 | Bonig | |
| 2018/0279934 A1 | 10/2018 | Wo | |
| 2018/0359195 A1 | 12/2018 | Shah et al. | |
| 2019/0097745 A1 | 3/2019 | Mallela et al. | |
| 2019/0222442 A1 | 7/2019 | Wei | |
| 2019/0259099 A1 | 8/2019 | Katsuyama et al. | |
| 2019/0349309 A1 | 11/2019 | Bonig | |
| 2019/0379768 A1 | 12/2019 | Amicangioli et al. | |
| 2020/0034929 A1 | 1/2020 | Rao | |
| 2020/0104269 A1 | 4/2020 | Pope et al. | |
| 2020/0134720 A1 | 4/2020 | Katsuyama | |
| 2020/0167865 A1 | 5/2020 | Craig | |
| 2020/0169355 A1 | 5/2020 | McIlroy | |
| 2020/0187274 A1 | 6/2020 | Rune et al. | |

FOREIGN PATENT DOCUMENTS

| | | |
|---|---|---|
| WO | 2012144999 A2 | 10/2012 |
| WO | 2018106350 A1 | 6/2018 |

OTHER PUBLICATIONS

Qiu et al., "Hierarchy Virtual Queue Based Flow Control in LTE/SAE," 2010 Second International Conference on Future Networks, pp. 78-82 (2010).

"Determinism is the new latency," Arista.com, Solution Brief.

"ICON® Deterministic Packet Transport," SEL Schweitzer Engineering Laboratories.

https://tools.ietf.org/html/draft-geng-detnet-requirements-bounded-latency-03; "Requirements of Layer 3 Deterministic Latency Service draft-geng-detnet-requirements-bounded-latency-03," (Mar. 4, 2020).

Non-Final Office Action dated Sep. 9, 2021 issued in related U.S. Appl. No. 16/988,491.

Ex-Parte Quayle Action dated Nov. 26, 2021 issued in related U.S. Appl. No. 16/988,043.

\* cited by examiner

LOCAL AND GLOBAL QUALITY OF SERVICE SHAPER ON INGRESS IN A DISTRIBUTED SYSTEM

BACKGROUND

Technical Field

This patent application relates to connected devices, and more particularly to controlling both sustained and burst message rates.

Background

The financial instrument trading systems currently in widespread use in the major stock exchanges allow traders to submit orders and receive confirmations, market data, and other information, electronically, via communications networks. The typical electronic trading system includes a matching engine, typically residing within a central server, and a plurality of gateways that provide access to the matching engine, as well as other distributed processors. The typical order process can be as follows: request messages representing orders are received (e.g., bid orders and/or ask orders), as sent from client devices, e.g., trader terminals operated by human users or servers executing automated trading algorithms). An order acknowledgement is then typically returned to the client devices via the gateway that forwarded the request. The exchange may perform additional processing before the order processing acknowledgement is returned to the client device.

The exchange system may also disseminate information related to the order message, either in the same form as received or otherwise, to other systems to generate market data output.

A "queue", in the context of communications or data processing, can be thought of as a temporary storage device. A data source pushes data onto the queue. The data sits idly in the queue until a data consumer is ready to pop data from the queue.

In data communications, "flow control" is the process of managing the rate of data transmission between two nodes. Flow control is used to prevent a fast sender from overwhelming a slow receiver. It provides a mechanism for the receiver to control the transmission speed, so that the receiving node is not overwhelmed with data. Flow control can involve controlling a "sustained rate" such as an average amount of data transmitted over time, or a "burst rate", such as some peak data rate experienced for a short period of time.

"Configuring Queuing and Flow Control", in Cisco Nexus 5000 Series NX-OS Quality of Service Configuration Guide, Release 5.2(1)N1(1) Apr. 3, 2016 is an example of "per-connection" flow control. An ingress Quality of Service (QoS) policy may be applied to an Ethernet interface to guarantee bandwidth for a specified traffic class. Buffer space, "no drop" thresholds and other flow control parameters may be set for each connection.

"Hierarchy Virtual Queue Based Flow Control in LTE/SAE", 2010 Second International Conference on Future Networks, IEEE Mar. 30, 2010 is an approach to flow control in a wireless network that associates a hierarchy of "virtual queues" with "real queues". Note that flow control may be implemented at three "levels"—UE (mobile handset), Cell, and eNBs. While virtual queues control flow at their respective levels, there does not however appear to be any suggestion of "global" control via a device through which all message traffic passes before reaching a set of compute nodes.

Pre-grant Publication US2012/0195203 (Juniper) describes techniques for flow control using multi-staged queues. However, the "multi-staged queues" are located within a given network device, which may tend to adversely impact a latency-sensitive design.

SUMMARY OF PREFERRED EMBODIMENTS

As described herein, preferred embodiments of a distributed computing system, such as an electronic trading system, control inbound message flow rates.

More particularly, in some distributed computing environments, it is desirable to limit the rate at which messages can be received into the system by a given client (or a given connection). This may be useful, for example, to prevent the communications link(s) between the distributed system and outside client(s) to become saturated and/or to prevent overloading the distributed system. Limiting the per-client inbound message rate also helps ensure fair provisioning of computing resources, so that a single client's excessive use of resources cannot overwhelm the system to such an extent that it prevents other clients from interacting with the distributed system.

In addition to controlling the message ingress rate on a per-client (or per-connection) basis, it may also be desirable to have system-wide control of the overall ingress rate into the distributed system across all client connections. This system-wide control ensures that the distributed system as a whole can maintain the required levels of service, including offering a predictable level of access for all clients.

Accordingly, a distributed data processing system or a corresponding method may control inbound message flow to a plurality of compute nodes and a system-level node. In such as system each of a plurality of gateway nodes receive messages from one or more client connections, control a sustained rate and/or burst rate of the messages on a per-client or per-connection basis, and then forward the messages to one or more compute nodes. A system level node receives the messages from the gateway nodes, controlling sustained flow and/or burst rate on a per-gateway-node-basis before forwarding the messages to compute nodes. As a result, the system level node thus also controls a system-wide message flow rate.

The system may be used to implement an electronic trading system where the messages are electronic trading messages. In such an embodiment, the compute nodes receive the electronic trading messages from the gateway nodes and a sequencer node, then operate on the electronic trading messages to perform an electronic trading function; an generating a response message that is in turn returned to one or more clients through the one or more gateways.

In other aspects, the message flow rate may be further controlled on the system-wide basis by providing feedback to one or more of the gateways. Feedback can be supplied in a number of ways, such as by lowering a window size on a per-connection basis for all connections from the system-level node to the gateway nodes; or lowering a burst and sustained rate configured in a per-connection token bucket for all connections from the system-level node to the gateway nodes; or pausing a respective gateway.

In still other embodiments, the sustained and/or burst rate may be further controlled on a per-client or per-connection basis by providing feedback from the respective gateway to a respective client or connection. Similar to the system-level control, applying feedback can involve lowering a window size on a per-client or per-connection basis for all client connections into the gateway nodes, lowering a burst and sustained rate configured in a per-client or per-connection token bucket for all client connections into the gateway nodes, or by pausing the client or connection.

Pausing a connection may involve setting a window size to zero for all clients or connections into the respective gateway, not adding new messages to a per-client or a per-connection FIFO for the respective gateway, or not servicing messages from a per-client or a per-connection FIFO queue.

In yet other aspects, a sustained flow rate or burst rate may be controlled by queuing the messages in a plurality of queues, then feeding the messages from the queues to a plurality of token buckets; and selecting messages from token buckets.

BRIEF DESCRIPTION OF THE DRAWINGS

Additional novel features and advantages of the approaches discussed herein are evident from the text that follows and the accompanying drawings, where.

DETAILED DESCRIPTION OF ILLUSTRATIVE EMBODIMENT(S)

System Overview

Example embodiments disclosed herein relate to a high-speed electronic trading system that provides a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

Figure 1:
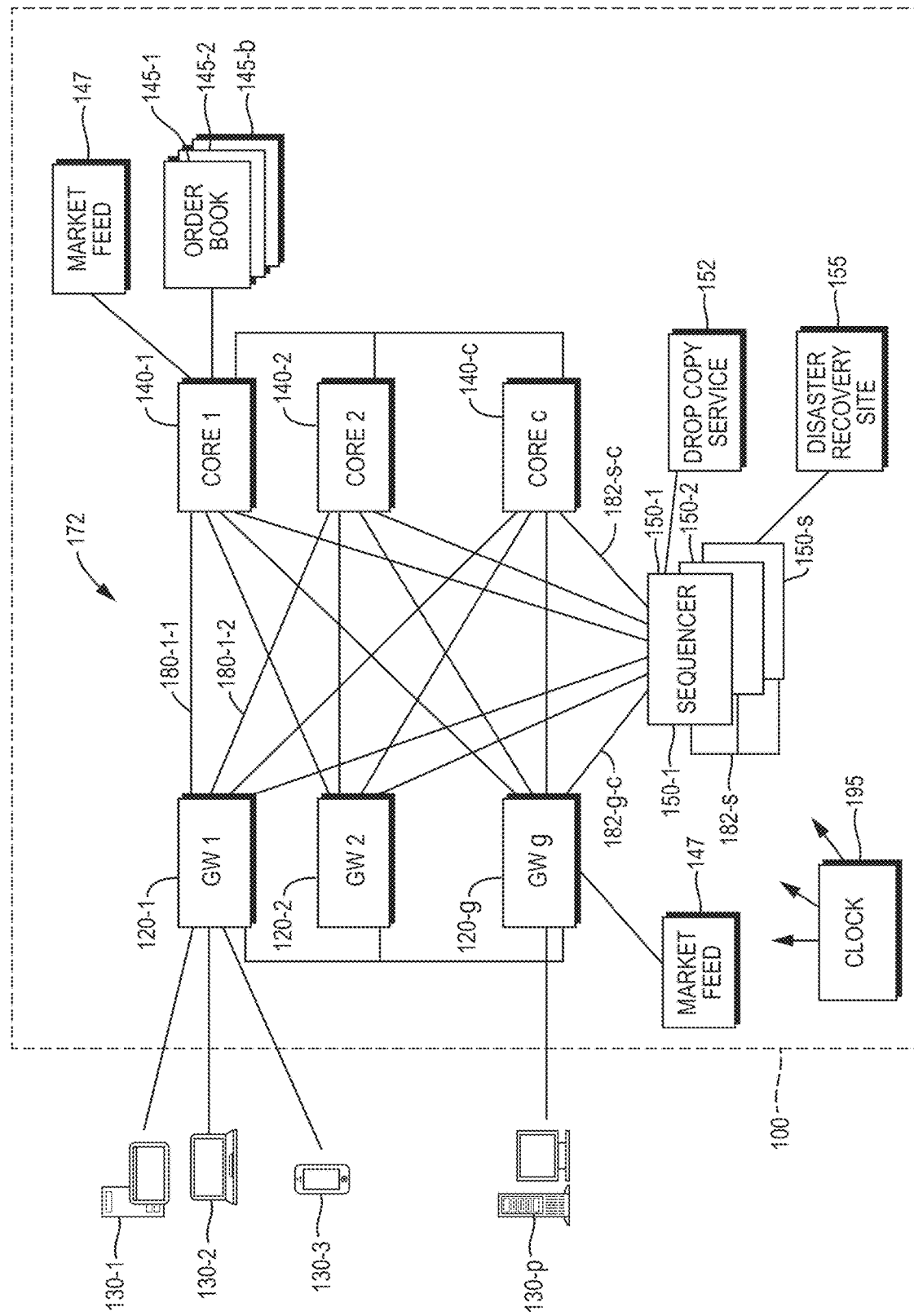
FIG. 1 is a high level block diagram of a distributed electronic trading system.

FIG. 1 illustrates an example electronic trading system 100 that includes a number of gateways 120-1, 120-2, ..., 120-g (collectively referred to as gateways 120), a set of core compute nodes 140-1, 140-2, ..., 140-c (collectively, the core compute nodes 140 or compute nodes 140), and one or more sequencers 150-1, 150-2, ..., 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, ..., 120-g are the peers for gateway 120-1, core compute nodes 140-2, ..., 140-c are the peers for core compute node 140-1, and sequencers 150-2, ..., 150-s are the peers for sequencer 150-1.

The electronic trading system 100 processes orders from and provides related information to one or more participant computing devices 130-1, 130-2, ..., 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, ..., 140-n (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, ..., 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, . . . , 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect-Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1, in some embodiments, dedicated connections 180 may also be provided among all the gateways 120, so that each gateway 120-1 has a dedicated connection 180 to each other gateway 120-2, . . . , 120-g. Similarly, in some embodiments, dedicated connections 180 are also provided among all the compute nodes 140, so that an example core compute node 140-1 has a dedicated connection 180 to each other core compute node 140-2, . . . , 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
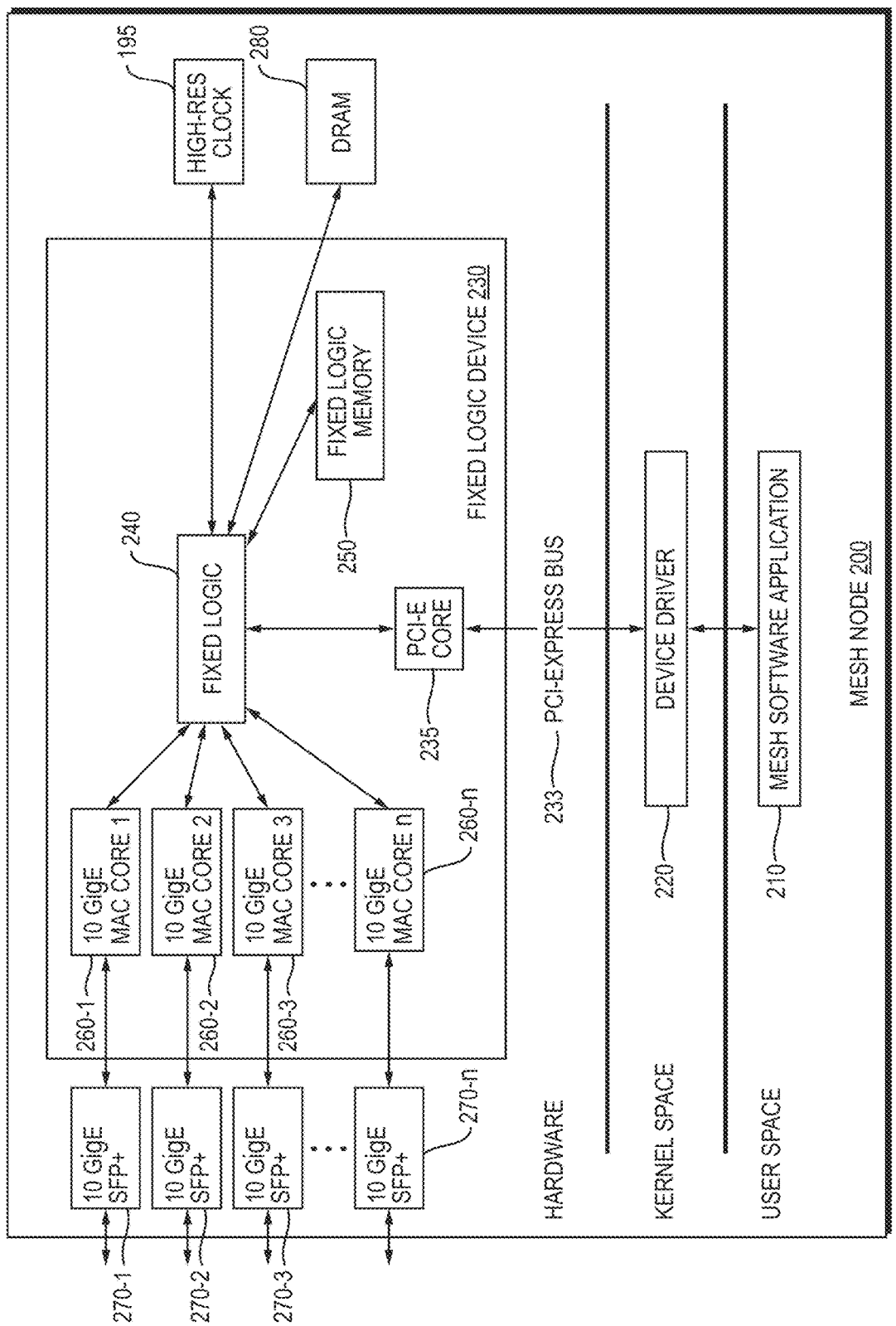
FIG. 2 is a more detailed view of a system component such as a gateway or compute node.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USB, Peripheral Component Interconnect (PCI)-Express, High Definition Multimedia Interface (HDMI), 10 Gigabit Ethernet (GigE), 25 GigE, 40 GigE, 100 GigE, or InfiniBand (IB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, . . . , 260-n, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

Quality of Service Shaper on Ingress

As mentioned above, the architecture of system 100 inherently supports another important goal of a distributed processing system, namely controlling the rate(s) at which incoming messages can be received by the system.

Limiting the per-client inbound message rate also helps ensure fair provisioning of computing resources, so that a single client's excessive use of resources cannot overwhelm the system to such an extent that it prevents other clients from interacting with the system.

When possible, the control should be over both the sustained inbound message rate as well as a burst rate.

In addition to controlling the message ingress rate on a per-client basis, it may also be desirable to have system-wide control of the overall ingress rate across all client connections. This system-wide control ensures that the distributed system as a whole can maintain the required levels of service, including offering a predictable latency level for all its clients.

Figure 3:
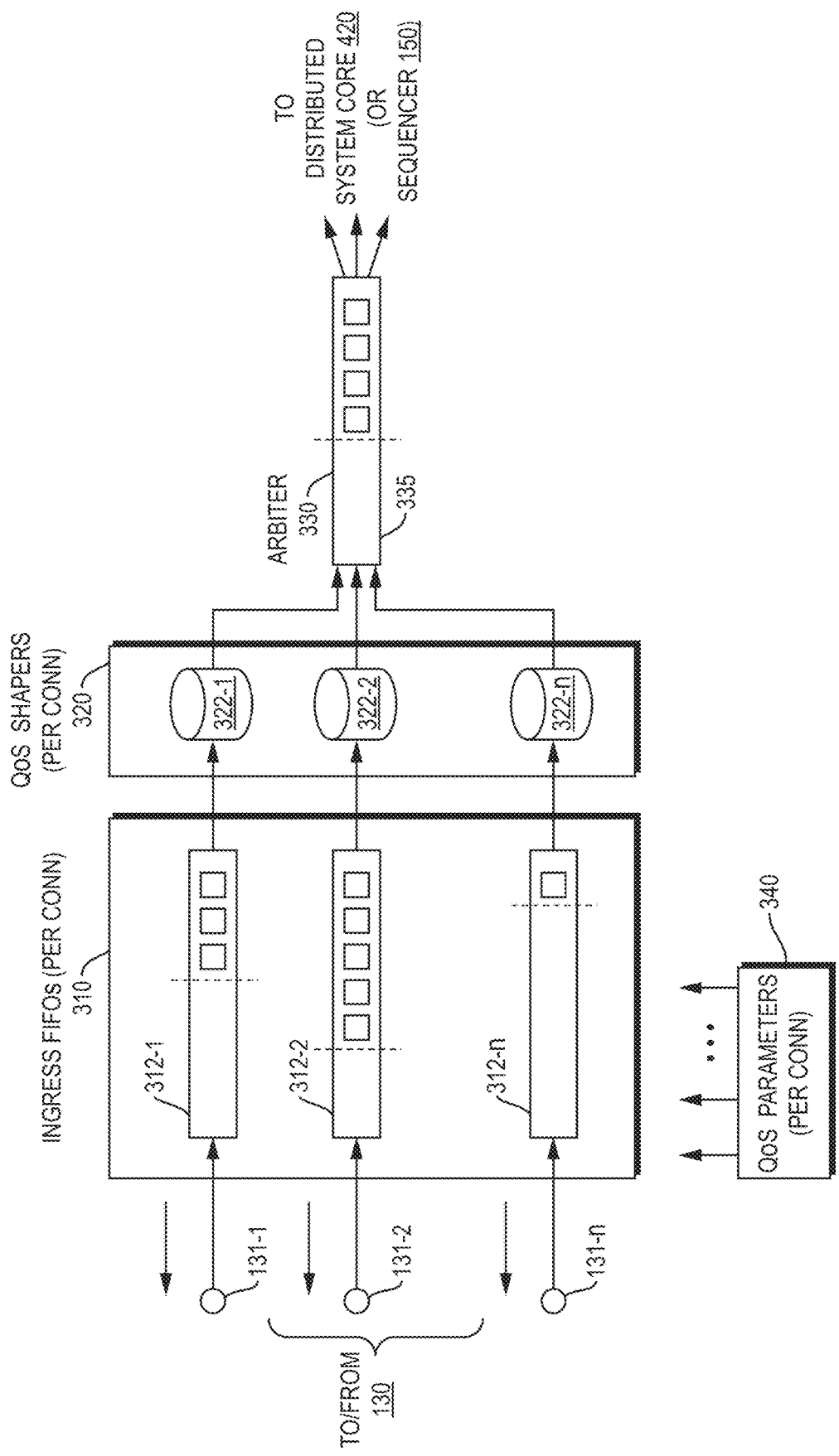
FIG. 3 shows an example of flow control at a point of client connection, such as within a gateway.

More particularly, FIG. 3 shows a more detailed view of a flow control portion 300 of an example gateway node 120 that was described in connection with the electronic trading system 100 of FIGS. 1 and 2. By way of review, incoming messages enter the distributed system 100 in an ingress direction over connections established between clients (such as one or more participant devices 130) and the gateway node 120.

The flow control 300 includes a per-connection queue 310, a per-connection QoS shaper 320, a round robin arbiter 330, and QoS parameter store 340. In some embodiments, the messages discussed herein are typically application level messages, such as requests to make a trade in an electronic trading system. As such, multiple application messages may be contained in a single inbound data structure such as a TCP packet. As will be discussed in detail below, traffic rate-shaping is performed at the message level, but the (flow control is implemented at some other level, such as at the per-connection level (for example, by controlling the TCP window size for each connection).

The per-connection queue 310 may include a set of FIFO queues 312-1, 312-2, . . . , 312-n) with a FIFO 312 associated with a corresponding connection 131-1, 131-2, . . . , 131-n. The per-connection queue 310 is responsible for holding incoming messages as they arrive before they are serviced by the rest of the distributed system. As a message is dequeued from the per-connection queue 310 to be serviced by the rest of the system 100, it enters a QOS shaper 320.

The QoS shaper 320 provides a corresponding set of token buckets 322-1, 322-2, . . . , 322-n, with one token bucket 322 associated with each client connection 131. The token bucket 322 for a given connection 1301 enforces the configured sustained flow rate and burst flow rate of that connection 131. For example, if the participant (client) 130 has not sent any messages in a while, the token bucket 322 allows the message to pass straight through. However, token bucket 322 instead throttles the client connection 131, as explained below, if the client has sent messages too quickly.

In other words, messages received from client connection 131-1 feed into FIFO 312-1 and then into token bucket 322-1. Messages received from client connection 131-2 feed into FIFO 312-2 and then into token bucket 322-2. Messages from connection 131-n feed into FIFO 312-n and then into token bucket 322-n. As explained below in more detail, messages from the token buckets 322-1, 322-2, 322-n aggregate into round robin arbiter 330.

A token may be considered to act as a "ticket" that allows a single message to pass through a token bucket 322. If one or more tokens are in the bucket, a message may consume one token from the bucket and pass straight through. When a message passes through a token bucket 322, the token consumed by the message is removed from the bucket.

Therefore, the burst rate is determined by the number of tokens that a token bucket 322 can hold. The sustained rate is a rate at which tokens may be added to the token bucket, which also corresponds to the maximum possible sustained "drain" rate of the bucket (if a message passing straight through the bucket is considered to be 'draining' from the bucket).

In this embodiment, with a round-robin arbiter 330 on the output end of the token buckets 322, by saying that a message 'passes straight through' the token bucket, it is meant that the message is immediately available to be pulled out by the arbiter 330. In other words, the round-robin arbiter 330 is continually cycling through each per-connection token bucket 322 to see, for each token bucket 322, if there is any message ready to be passed straight through.

The token buckets 322 assist with ensuring fairness, by not allowing a single connection 131 or set of connections to overly consume the resources represented by cores 140. Yet token buckets 322 also "reward 'good behavior'", meaning that if a client 130 matches their sending rate to the sustained flow rate of its assigned token bucket 322, their messages should pass straight through with no or minimal latency impact.

The token buckets 322 may be thus managed in the following manner:

a) Tokens are added to each bucket at program selected rates ranging from a few microseconds up to a second;
b) The number of tokens added at each interval may be controlled, e.g., program-selected; and
c) The maximum number of tokens in each bucket is also programable.

It should be noted that a) and b) together correspond to the desired sustained rate, and c) corresponds to the burst rate. The net effect is that:

a) The maximum number of orders per period per client may be individually selected;
b) The maximum burst order rate may also be selectable per client;
c) The overall order rate may also be selectable per client; and
d) The overall system order rate may also be selectable.

One or more of these parameters 340 may be tuned as one possible way to deal with a situation where it becomes necessary to slow down the flow of messages coming in from one or more connections 131. More particularly, if significant backpressure is detected for a connection (for example, the FIFO queue 322 for a given connection 131 is filling up beyond a certain point), a feedback mechanism may be used by which the gateway 120 notifies the corresponding client 130 to slow down its message transmission rate.

As will be explained in more detail with FIGS. 7 and 8 below, in one example implementation, if the client connection 131 is established over TCP, the gateway 120 could reduce the advertised TCP receive window size for that connection. Explicitly reducing the TCP window size is but one way to control the rate at which messages are received, however. Another way to control the sustained rate and burst rate when a connection 131 needs to be slowed down is by explicitly tuning the token bucket parameters 340 themselves, specifying a burst rate and/or sustained rate for that connection 131. Lowering the burst rate and/or sustained rate may end up eventually reducing the TCP window size, as an artifact of how the TCP protocol itself works (such as when TCP detects that an application is not servicing packets at a sufficiently fast rate. It may be possible to use either approach, or a combination of both approaches).

In some embodiments, there may be an advantage to tuning the QoS token bucket parameters 340, rather than by adjusting the TCP window size. By specify the token bucket parameters, such as in units of messages versus being the limit being specified in units of bytes (as would be a TCP window size) the system 100 becomes "protocol agnostic". That is, by adjusting the token bucket parameters directly, the system 100 would not favor protocols which tend to use larger or smaller message sizes over other protocols. For example, FIX messages may tend to be larger than messages encoded with binary protocols, but by controlling the rate of ingress flow on a per-message basis, clients 130 sending messages over a FIX connection 131 are not penalized for choosing a protocol with larger overall message sizes. Even within the same message type in the same protocol, there could be message size variability, through the use of optional tags or parameters by the client 130. For example, in FIX, a client 130 may choose to send larger FIX messages by including additional information in optional tags, and it may not be desirable to penalize such clients with regards to flow control if the client chose to include more information in their messages.

In some implementations, a round-robin arbiter 330 (which may also have its own internal FIFO queue(s)) is located downstream from the QOS shaper 320. Arbiter 330 cycles through the output of the set of token buckets 322-1, 322-2, . . . , 322-n in a round-robin fashion, pulling a message out from a token bucket, and then forwarding the message to be serviced by the rest of the distributed system, such as by one or more of the cores 140.

Note also that consistent with the example implementation of FIG. 1, the message may also be sent by the gateway to the sequencer 150. In other embodiments, the gateway 120 may only send the message to the sequencer 150, in which case the sequencer 150 may then forward the message to one or more of the cores 140.

The QOS parameter settings 340 provide inputs to control the behavior of the per-connection queue 310 and QOS shaper 320. These parameter settings 340 may specify a maximum depth for a corresponding connection's FIFO 312, and/or the size of its corresponding token bucket 322. The QOS parameter settings 340 may be applied on a per-connection basis, even if they may be specified on a system-wide, a per-gateway, a per-client and/or a per-connection basis. As already explained above, these QoS parameters control the burst rate and the sustained rate.

More particularly, in some embodiments, the sustained rate and burst rate in the QOS shaper 320 may be configured on a per-client or per-connection basis, thereby allowing the provider of the distributed system to charge different clients varying amounts depending on the configured inbound rate for a given client connection 131.

Typically, if a client desires to increase its maximum ingress message rate into a financial matching engine, the client would be required to add additional connections 131 into system 100 to gain more access to the matching engine(s) provided by the nodes 140. These multiple connections not only take time (sometimes one day or more) to configure, but often require human intervention and coordination among various data center service providers, and are therefore also prone to human error. Allowing a client to dynamically adjust during the trading day its maximum inbound message rate over a single connection into the matching engine without the need to create more connections therefore provides the client additional flexibility and minimizes the risk of misconfiguration.

Nonetheless, it should be understood that each client 130 may possibly use more than one connection 131, or a given connection 131 may service more than one client 130. The "per-connection" queue 310 and the "per-connection QOS shaper" 320 may therefore, alternatively, be a "per-client" queue or "per-client" shaper in some embodiments.

Figure 4:
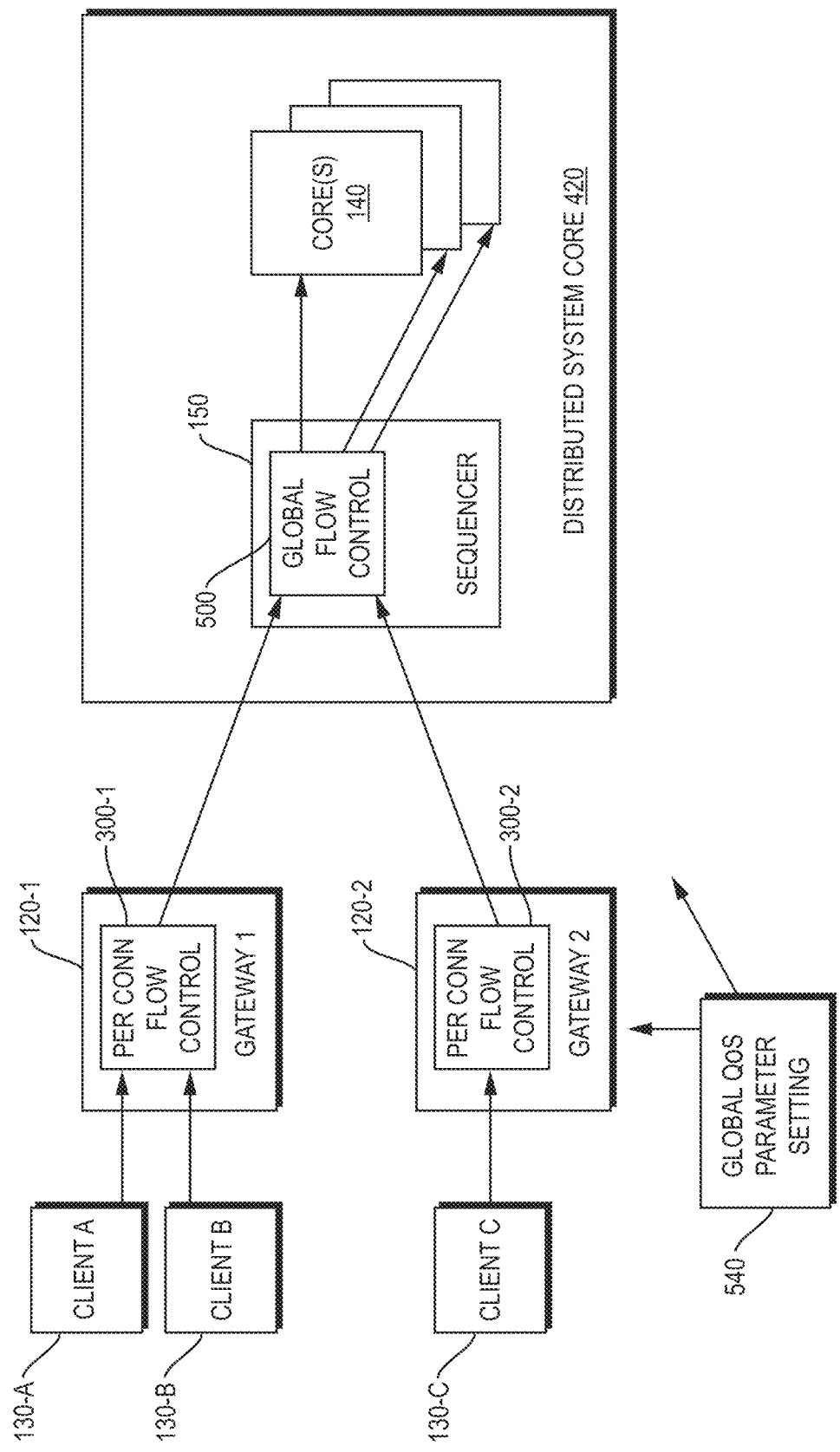
FIG. 4 shows an example of global (system-level) flow control.

FIG. 4 illustrates another aspect of a preferred implementation of the system 100. Here, each gateway 120-1, 120-2, . . . , 120-n has its own respective per-connection flow control 300-1, 300-2, . . . , 300-n, and there is also a global flow control 500 that may be resident within one or more of the sequencers 150. Global flow control 500 provides another system-wide QoS layer, with feedback to the gateways 120. This enables the system 100 to also slow down the gateways when necessary, helping to ensure that the system as a whole can always operate within the required service levels. The sequencer 150, its corresponding global flow control 500, and the core(s) 140 will be referred to herein as the distributed system core 420.

In some implementations, when a message enters the distributed system core 400 from a gateway node 120, it always first passes through a single node (e.g., the sequencer 150). This system-wide view presented to the sequencer 150 allows it to, when necessary, limit the overall rate at which messages across all gateways 120-1, 120-2, . . . , 120-n and thus all connections enter the distributed system core 420. Thus, via the global flow control 500 (as controlled by global QoS parameters 540), the overall incoming message rate for the system 100 as a whole may be controlled.

It should be understood that the global control QoS parameters 540 may be temporarily adjusted and tuned dynamically depending upon current conditions being experienced by system 100. For example, under a sudden period of heavy load, a catastrophic event, or system failure, etc., the global parameters 540 may be accordingly adjusted.

Figure 5:
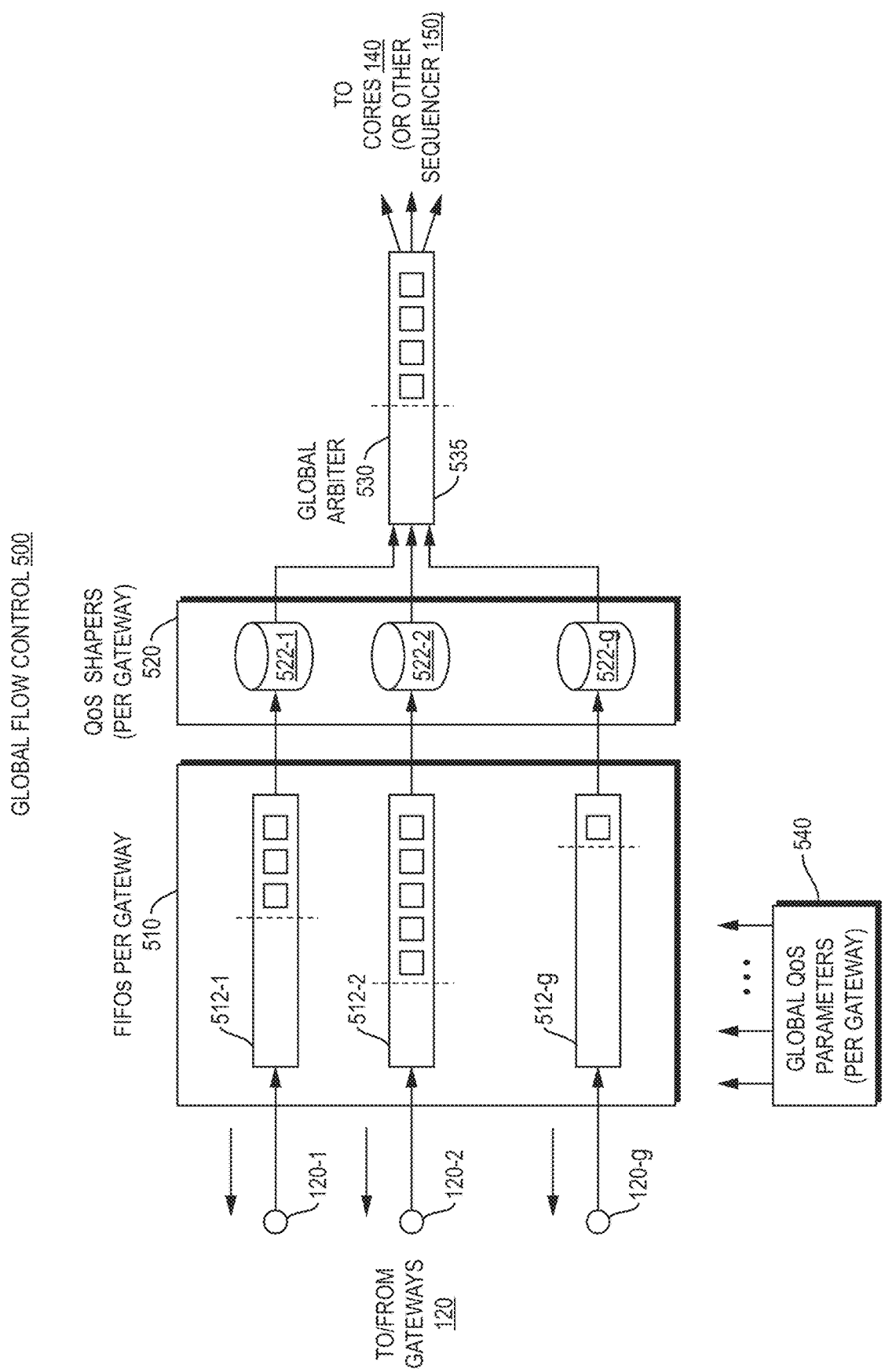
FIG. 5 is a more detailed view of flow control within the gateway.

FIG. 5 is a more detailed view of an example global flow control 500, which may include a message queue 510 comprising a set of per-gateway FIFOs 512-,1, 512-2, . . . , 512-n, a global QoS shaper 520 which includes a set of per-gateway token buckets 522-1, 522-2, . . . , 522-n, a global arbiter 530, and global QOS parameters 540. These elements function similar to the corresponding elements with the gateway flow control units 300, but instead operate to control the flow between the gateways 120 and the cores 140.

In some embodiments the rate limiting provided by the global flow 500 may take the form of just the FIFO queues 512 alone, while in other embodiments, global flow may also use the token buckets 522 for incoming rate shaping.

Global flow control 500 provides an additional advantage to the system in some circumstances. For example, if every client using the system 100 tends to operate near their assigned messaging rate, such that each client might not be exceeding their individual token buckets, the overall sum of the rates might exceed what the system can handle.

As explained above, every message entering the system 100 is expected to be forwarded to the sequencer, and hence arrive at the global queue 510. By controlling a sustained and/or burst rate at this point, the global flow control becomes a single "choke point" at which all inbound system messaging controlled.

If the global flow control 500 becomes overloaded, it has a feedback path for adjusting flow control with the gateways. This is not normally expected to happen, since the system 100 should be normally designed to handle an expected peak number of incoming messages. In other words, the designer of the system 100 can determine the maximum needed provisioning for the cores, given a maximum incoming message rate for the clients.

Also, upon an indication that any one gateway starts to experience backpressure (such as due to congestion), the global flow control 500 can decide to slow down all of the gateways, and not just the one experiencing overload. This could yield fairer results as opposed to only slowing down the overloaded gateway.

Another observation about this approach is that rate at which ingress traffic is allowed inherently controls the net egress traffic in the other direction (e.g., response message flowing from the cores 140 to the clients 130). This may be the case in the context of a system such as a trading system where an ingress message typically generates a corresponding egress message. In other words, by controlling the rate at which trade orders are allowed to enter the system 100, there is inherent control over a rate at which the system 100 generates messages that represent the dispositions of those orders.

Controlling QOS on a both a per-connection and an overall system basis also helps with an aspect of access fairness in an electronic trading system. In systems without such control, a client 130-1 using gateway 120-1 with three other "heavy traders" may not be given as much access as another client 130-2 who is the only client connected to a second gateway 120-2. By instead servicing the both the connections and the gateways on a round-robin basis each client is given its fair share of access, and no one client will be "crowded out" by the others.

When gateways 120 are provisioned, their maximum sustained and burst rate may be configured such that any single gateway cannot overload the ability of the system 100 to process messages. This can be accomplished by appropriately setting the QoS parameters 340 and/or by limiting the speed at which individual connections can send messages.

Also, in some embodiments, a trading system 100 may preferably over-provision the capability of set of cores 140 such that they will collectively always be guaranteed to easily handle far more messages than the maximum number of inbound trading messages from all clients and all gateways. This will also assist with ensuring fairness of access.

In some embodiments, the message rate limiting at the sequencer 150 (e.g, by the global flow control 500) is provided via a simple FIFO queue 535. In such an instance, the gateways 120 may detect backpressure (e.g., congestion) at the global level implicitly as the global queue 510 in the sequencer 150 fills up. In this instance, the gateways 120 may adjust their own QOS shaper 320 accordingly, to perhaps temporarily further limit the incoming flow of messages into the distributed system core 420.

In another embodiment, where the global flow 500 only uses a FIFO 510 and not also a QoS shaper 520, a request message may be sent back from global flow 500 to the gateways 120 such as over interface 182 to slow down when a nearly full FIFO 510 condition is detected. More particularly, such a message could indicate that the sender temporarily can no longer receive any messages or will soon exhaust its queue.

In general, the system 100 may be configured such that receiver nodes (which may be any one or more of the nodes in system 100, periodically communicate to the sender node(s) a special administrative type message (i.e., not a trading message) with an indication of how much more data (e.g., in units of trading messages, or bytes, or some other measurement), that receiver is capable of receiving. For example, the global flow 500 in sequencer 150 may periodically communicate back to the gateways 120 an indication of how much "room" it has to receive additional messages from the gateways 120. The QOS shaper 320 on the sender node (e.g., gateway 120), then adjusts its QOS parameter settings 340 appropriately.

The gateway(s) 120 might also then propagate that information to be applied across all connections 131 on the gateway 120. The adjustments could involve, for example, making changes to each connection's TCP window size and/or adjusting the corresponding per-connection token bucket 310 parameters.

Similar administrative messages may be exchanged at other points in the system, for example, from the cores 140 to the sequencer 150 and gateways 120 for messages flowing in the inbound direction (from participants 130), and even in the other direction (e.g. outbound direction) for messages flowing from the sequencer 150 or the cores 140 to the gateways 130. In the case of congestion in the outbound direction, the QOS shapers 320 in the gateways and QOS shapers 520 in sequencer 150 (e.g., in the global flow control 500) may still adjust the corresponding QOS parameters 540 in the inbound direction.

In other embodiments with a more active form of rate limiting at the global flow control 500 in the sequencer 150, such by using a QOS shaper 520 having a token bucket 522 per gateway, the global flow control 500 may proactively communicate back to the gateway nodes 130 to request that they temporarily slow down or even pause their flow of exiting messages. This could be done, for example, by reducing the gateway(s)' flow to one-half of their usual permitted level). After the flow is adjusted, the global flow controller 500 may then indicate to the gateway nodes 120 to resume normal operation.

Figure 6:
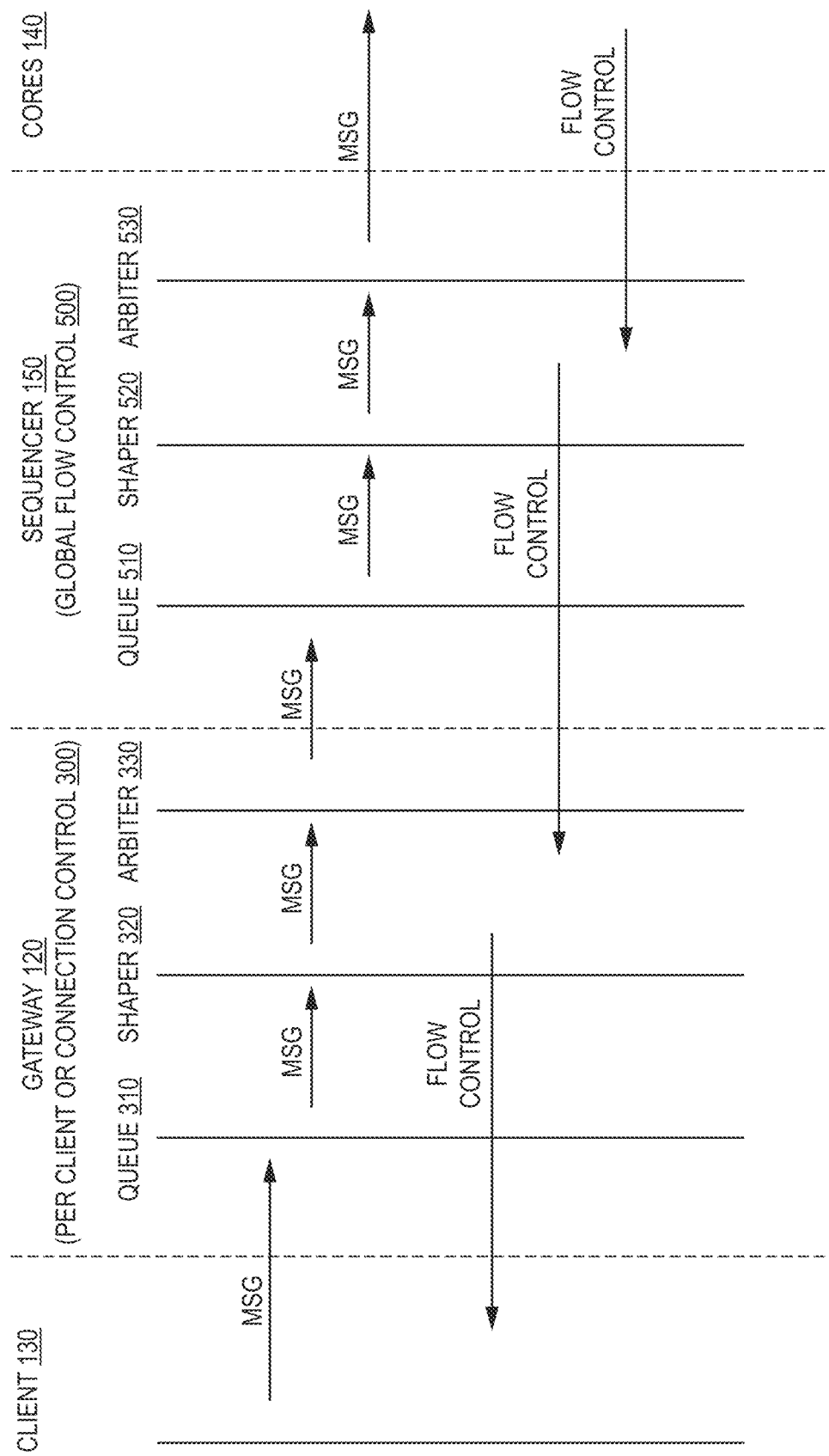
FIG. 6 is a more detailed view of flow control at a global (system) level.

FIG. 6 illustrates one embodiment of a hierarchy of flow control messages that may be used in the system 100. As explained above, gateways 120 feed messages to the sequencer 150 which in turn forwards messages to the cores 140. At the various places in the system where queuing is possible, flow control is also implemented (in any of the ways already explained). Accordingly, for example, the shaper 330 in a gateway 120 may apply flow control to the clients 130; the shaper 520 in the sequencer 150 may apply flow control to the gateway(s) 120; and the cores 140 may apply flow control to shaper 520 the sequencer 150.

A gateway 120 may adjust flow control for an individual client 130 that is causing an overload, or it can throttle back all clients 130 that it handles. Similarly, the sequencer can, in some embodiments, adjust flow control to an individual gateway 120 that is causing an overload, or it can throttle back all gateways 120 until the system wide overload is cleared.

There are several ways to implement flow control, such as via a pause operation. This could be accomplished by pausing a clock that feeds the respective token buckets in a respective gateway shaper 320 or global shaper 520. When sufficient messages have been cleared, the flow control can be relieved by again enabling the token bucket clocks. Flow control can be applied dynamically (based on present detected flow rates) or by setting fixed configuration parameters at the time the system is provisioned. In other embodiments where it is not possible to pause a clock, a pause operation may set the TCP window size to 0, set the token bucket parameters to 0, and/or stop servicing messages from the various queues.

It should be understood that either egress processing or ingress processing or both may be paused. So, while pausing ingress processing, if egress is not paused, the system may still send outbound messages to the clients.

Figure 7:
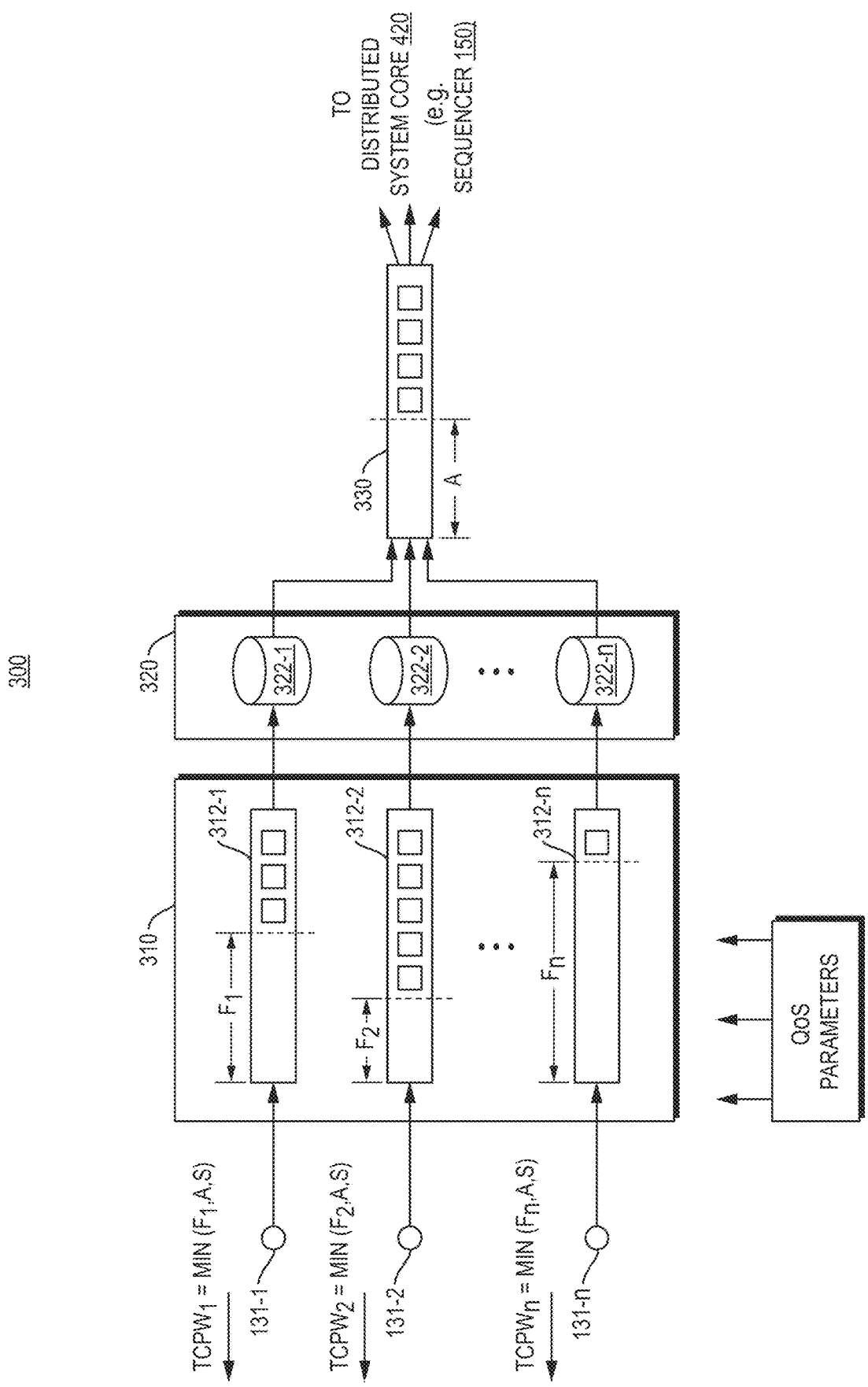
FIG. 7 is an example using TCP window size to control backpressure at the gateway.

FIG. 7 shows a possible implementation for how flow control 300 may be applied in an example gateway 120. By way of review, messages flowing in from each client connection 131-1, 131-2, . . . , 131-n are placed in a corresponding one of the per-connection FIFOs 312-1, 312-2, . . . 312-n. For example, messages received on connection 'conn 1' 131-1 are placed into a FIFO queue 312-1. FIFO 312-1 has three messages queued up, but with room for a certain number ('F1') of additional messages that could fit before it fills up. A per-connection QOS shaper 322-1, which may be implemented as a token bucket that controls the burst rate and sustained rate of messages, pulls the next message from the FIFO queue 312-1 when it is time to let another message through. That time may be determined according to the per-connection QOS shaper's 320-1 configured rate settings 340.

From the per-connection QOS shaper 322-1, the message may then enter the arbiter 330 shared across all of the client connections 131. Arbiter 330 may also have its own FIFO queue 335. As illustrated, at the present time, the shared arbiter's FIFO queue 335 contains four (4) queued messages, with room for a certain number ('A') of additional messages before the shared arbiter's FIFO queue 335 would be full. The shared arbiter 330 emits one message at a time from among all the client connections, for example, in a round-robin fashion, and sends it to the distributed system core 420, where it may enter the sequencer 150 (and its corresponding global flow control 500).

As can be seen in FIG. 7, the per-connection TCP window size for 'corm 1' 130-1 is continuously determined as a function (for example, the 'min' function) of the number of additional messages ('F1') that can still fit in the per-connection FIFO queue 322-1 (that is, how much "ingress space" is still available for the connection) and the number of additional messages ('A') that can still fit in the shared arbiter's queue 335 (that is, how many more messages can the gateway as a whole handle). Applying a TCP "window squeeze" in this matter, e.g., reducing the TCP window size, is one way that the gateway can throttle back the rate at which connection 131-1 is sending inbound messages. The rate limiting input '5', which may be determined by the sequencer 150 could be a constant across all gateways, or it could be a per-gateway value.

The client 130-1 using connection 131-1 can specify a smaller value than F1 or A such as in an event that a client because the client may not itself be able to handle the minimum value.

In addition, there may be other mechanisms to adjust the flow rate of a connection in addition to those mentioned above. For example, when an individual gateway 130 detects that it is overwhelmed, it can slow itself down, or send a message to the approach the sequencer's role as one among several mechanisms to provide feedback that ultimately throttles the per-client-connection rate shaper in the gateways.

Other methods and reasons to throttle client connections may include:

statically, because of connection classification or server classification (premier, beginner trial, onboarding, etc.).

or dynamically, due to backpressure from any of the connected client.

As discussed in more detail elsewhere, the global flow controller 500 in the sequencer 150 might also provide feedback to slow down one, some, or all of the gateways 120 when the global aggregator 530 starts to back up, or any other per-node queue.

It may also be possible to have two aggregators in the sequencer 150—one for the gateway-to-core direction and a second for the core-to-gateway direction. In some embodiments, the global flow in sequencer 150 may have a single queue that aggregates messages from both the gateways and cores. But in other embodiments, the global flow 500 in sequencer 150 may have two queues, one that aggregates messages received from the gateways 120 and another to aggregate messages received from the cores 140.

Another embodiment may configure the compute nodes 140 to assist with congestion. When a particular compute node 140 becomes too busy, it may send a message to the gateway flow controller 300 or global flow controller 500 asking that the inbound data flow to it be slowed. If the message is sent first to the global flow controller 500 (or some other central authority), the sequencer 150 has the opportunity to decide whether the congestion in the requesting compute node 140 warrants slowing down the ingress flow, in which case it could which would then forward an equivalent message to the gateway(s)) to tell those gateway(s) to slow down. The sequencer or other central authority many also determine that no slow down on ingress needs to take place, for example, if the response latency is not currently impacted or expected to be currently impacted, because compute nodes servicing the same symbols as the overwhelmed compute node are not currently experience any congestion.

In a case where the system 100 is a trading system, the sequencer may also respond to a compute node's 140-1 request to relieve congestion by reassigning symbols away from the congested node 140-1 to some other, less congested node 140-2.

In some scenarios, Queue buildup on egress (e.g., the egress queue filling to capacity) can in turn affect ingress flow control. This is especially the case in some embodiments, such as an electronic trading system, where message flow may very well be asymmetric (e.g., the number of egress messages exceeds the number of ingress messages). This may occur in an electronic trading system when:

A switch dies causing Cancel on disconnect for many sessions. This will cause a storm of asynchronous cancel messages.

Crossing orders, where a single order with a large quantity can match against many counterparties.

Many orders with the same time-in-force expiration

End of day, when many single day orders need cancelling

The core nodes 140 could also back up, for example, if a large number of "fill" orders or "cancel on disconnect" are all generated. Those may have resulted from some infrastructure failure such as a failure of a switch between the clients and the system 100. A halt or circuit-breaker like functionality may thus also be used to slow down the whole system 100 for a period of time when certain events occur (such as "market 8% down since open), or time of day (for example, at lunch hour), or based on an IPO, or based on a holiday schedule.

As was described above in conjunction with FIG. 4, the sequencer 150 may also have a role in shaping the rate limit of each gateway 130, and communicate feedback to the gateways 130 when significant system-wide congestion is detected. Thus, the functionality illustrated in FIG. 7 for calculating the per-connection TCP window size for a client connection, can be extended to the global flow controller 500.

Figure 8:
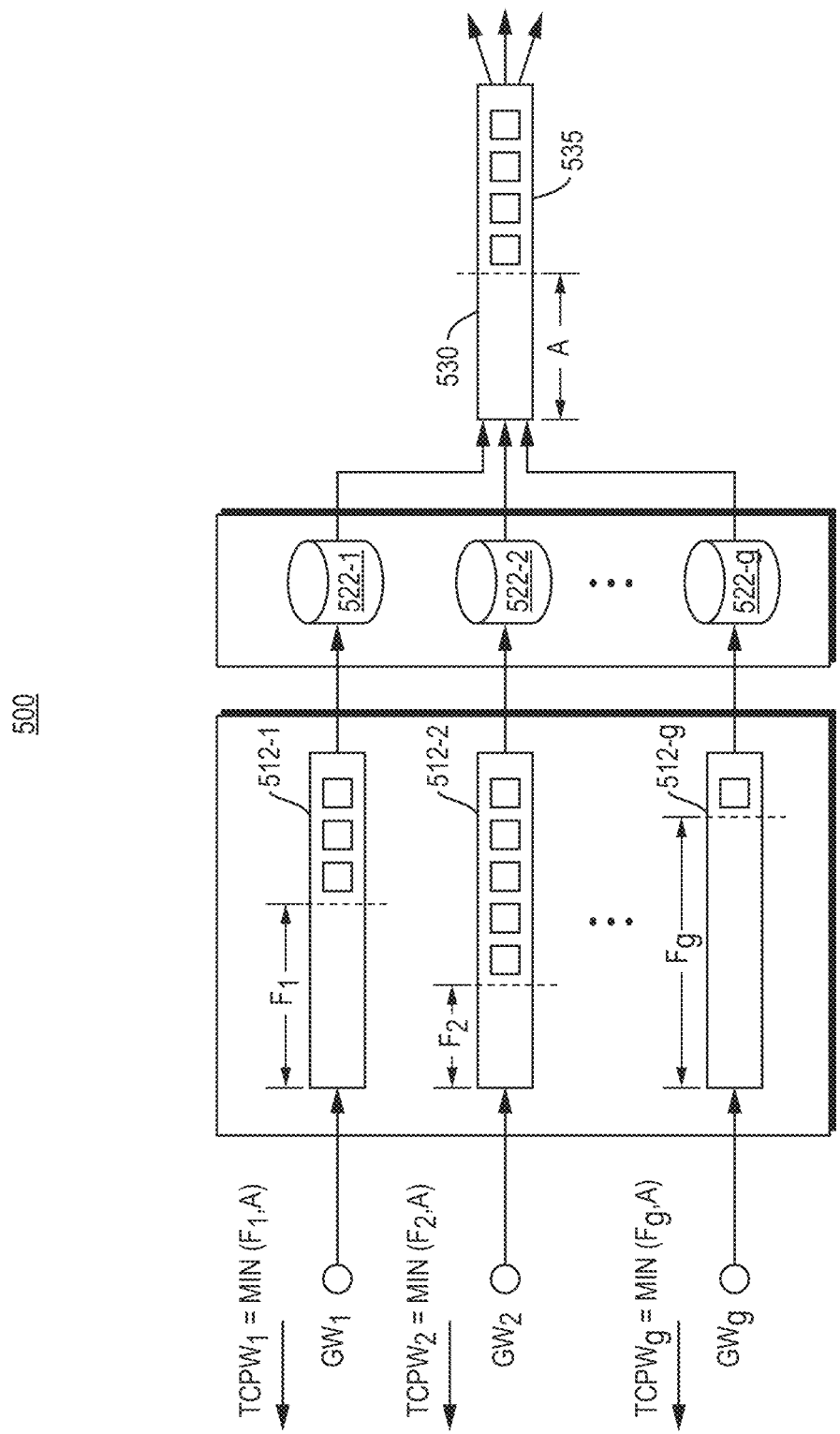
FIG. 8 is an example using TCP window size to control backpressure at the system level.

FIG. 8 is an example for how flow control may be applied by the global flow control 500 in an example sequencer 150. By way of review, messages flowing in from each gateway 120-1, 120-2, . . . , 120-n are placed in a corresponding one of the per-gateway FIFOs 512-1, 512-2, . . . 512-n. For example, messages received from gateway 120-1 are placed into a FIFO queue 512-1. FIFO 512-1 has three messages queued up, but with room for a certain number ('F1') of additional messages that could fit before it fills up. A global QOS shaper 522-1, which may be implemented as a token bucket that controls the burst rate and sustained rate of messages, pulls the next message from the FIFO queue 512-1 when it is time to let another message through. That time may be determined according to the global QOS shaper's 522-1 configured rate settings. However, in some embodiments, the global arbiter 530 may pull a message directly from a FIFO queue 512-1 if the QoS shaper 522 "gives it permission", i.e., there is at least one token in the corresponding bucket 522-1. An analogous implementation is also possible for the per-connection token buckets 322 and arbiter 330 at the gateway flow control level 300.

From a global QOS shaper 522-1, the message may then enter the arbiter 530 shared across all of the gateways 130. Arbiter 530 may also have its own FIFO queue 535. As illustrated, at the present time, the global arbiter's FIFO queue 535 contains four (4) queued messages, with room for a certain number ('A') of additional messages before the global arbiter's FIFO queue 535 would be full. The shared arbiter 530 emits one message at a time from among all the gateways, for example, in a round-robin fashion, and sends it to the cores 140.

In one embodiment, there may not be a TCP window size adjustment for the connections between the sequencer 150 and the gateways 130. This is because the mesh 172 is likely to be direct, point to point connections that do not require the overhead of a protocol such as TCP.

To summarize, if the global flow 500 needs to reduce congestion, it can do one or more of the following:
a) adjust the per-gateway token bucket parameters (if possible),
b) adjust the per-gateway-to-sequencer connection TCP window size for one or more gateways (if possible),
c) send a message to one or more gateways to have them adjust their flow, and in response to that message from the global flow 500, the one or more gateways may:
 i. adjust the TCP window size for all client-to-gateway connections (e.g., connections 131-1, 131-2, . . . , 131-n) on that gateway, and/or
 ii. adjust the per-client-connection token bucket parameters for all client-to gateway-connections on that gateway, and/or d) pause one or more of the client-to-gateway connections (using the various pause options discussed above)

In some embodiments, it may not be the responsibility of the global flow 500 in the sequencer 150 to identify an individual client-to-gateway connection that might need to be slowed down, as it might be inefficient and/or difficult to do so. More likely, the global flow control 500 in the sequencer 150 would slow down all traffic from a single gateway (such as gateway 120-1), or the traffic from some subset of all gateways 120-1, 120-2, . . . 120-g) or perhaps even all gateways 120. Such flow control may be implemented in any of the ways discussed elsewhere herein.

Other Use Cases

The architecture described above may be of use in applications other than electronic trading systems. For example, it is possible that it may be used to monitor data streams flowing across a network, to capture packets, decode the packets' raw data, analyze packet content in real time, and provide responses, for applications other than handling securities trade orders.

Further Implementation Options

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. A method of operating a distributed data processing system to control inbound flow of messages from a plurality of gateway nodes to a plurality of compute nodes and to a system-level node, wherein the distributed data processing system is an electronic trading system, and the messages are electronic trading messages, the method comprising:
   at each of the plurality of gateway nodes:
      receiving the messages over one or more client connections;
      controlling a sustained flow rate and/or a burst flow rate of the messages on a per-client or per-connection basis; and
      forwarding the messages to the system-level node;
   at the system-level node:
      receiving the messages from each of the plurality of gateway nodes;
      controlling a system-wide message flow rate, wherein controlling the system-wide message flow rate further comprises controlling a sustained flow rate and/or a burst flow rate on a per-gateway-node-basis for each of the plurality of gateway nodes;
      forwarding the messages to the compute nodes;
   at each of the plurality of compute nodes:
      receiving the messages from the system-level node; and
      operating on the messages to perform an electronic trading function;
   at a selected one of the compute nodes:
      generating a response message; and
      returning the response message to a selected one of the gateway nodes; and
   at the selected gateway node:
      returning the response message over at least one of the one or more client connections.

2. The method of claim 1 wherein
   the messages are application layer messages, in which multiple application layer messages are contained in a lower layer protocol packet; and
   wherein at least one of the steps of controlling the sustained flow rate and/or burst flow rate further comprises providing feedback to the lower layer protocol.

3. The method of claim 2 wherein the lower layer protocol is a transport layer protocol, and the feedback is provided by controlling a transport layer window size.

4. The method of claim 1 wherein the system-level node is a sequencer node, and wherein the method further comprises:
   at one or more of the gateway nodes:
      forwarding the messages to the sequencer node;
   at each of the compute nodes:
      receiving the messages from the sequencer node;
      and wherein operating on the messages to perform an electronic trading function further comprises operating on the messages received from the one or more gateway nodes and/or operating on the messages received from the sequencer node.

5. The method of claim 1 wherein at least one of the steps of controlling sustained flow rate and/or burst flow rate further comprises:
   queuing the messages with a plurality of queues;
   feeding the messages from the queues to a plurality of token buckets; and
   selecting the messages from token buckets.

6. The method of claim 5 wherein the queues are FIFOs.

7. The method of claim 5 wherein the selecting is on a round-robin basis.

8. The method of claim 1 wherein the sustained flow rate and/or burst flow rate is further controlled on the per-client or per-connection basis in response to a client request.

9. The method of claim 1 wherein the system-wide message flow rate is further controlled by providing feedback to one or more of the gateway nodes.

10. The method of claim 9 where the step of providing feedback further comprises at least one of:
   lowering a TCP window size on a per-connection basis for all connections from the system-level node to the one or more of the gateway nodes, or
   lowering the sustained flow rate and/or the burst flow rate by adjusting at least one parameter of a per-connection token bucket for all connections from the system-level node to the one or more of the gateway nodes, or
   sending a feedback message to the one or more of the gateway nodes.

11. The method of claim 1 wherein the system-wide message flow rate is further controlled by pausing one or more of the gateway nodes.

12. The method of claim 11 wherein the step of pausing one or more of the gateway nodes further comprises at least one of:
   setting a TCP window size to zero for a least one client connection on the one or more of the gateway nodes,
   not adding new messages to at least one per-connection FIFO queue for the one or more of the gateway nodes, not servicing messages from at least one per-connection FIFO queue for the one or more of the gateway nodes, or setting at least one of the sustained flow rate and/or burst flow rate for at least one connection on the one or more gateway nodes to zero.

13. The method of claim 1 wherein controlling the sustained flow rate and/or burst flow rate on the per-client or per-connection basis further comprises:

controlling a flow from one of the gateway nodes to a selected client and/or connection.

14. The method of claim 1 where the step of controlling the sustained flow rate and/or burst flow rate further comprises at least one of:

lowering a TCP window size on a per-client or per-connection basis; or lowering the sustained flow rate and/or burst flow rate by adjusting at least one parameter of a per-client or per-connection token bucket.

15. The method of claim 1 wherein the sustained flow rate and/or burst flow rate on the per-client or per-connection basis is further controlled on the per-client or per-connection basis by pausing at least one client or connection.

16. The method of claim 15 wherein the step of pausing at least one client or connection further comprises at least one of:

setting a TCP window size to zero on a per-client or per-connection basis, not adding new messages to a per-client or a per-connection FIFO for at least one of the gateway nodes, not servicing messages from a per-client or a per-connection FIFO queue, or setting at least one of the sustained flow rate or burst flow rate for at least one client or connection to zero.

17. The method of claim 1 additionally comprising:

receiving the messages at the system-level node from the gateway nodes via a full mesh set of point to point direct connections.

18. The method of claim 1 additionally comprising:
at the system-level node:

receiving the messages from the compute nodes; and slowing a rate at which the messages are received from the gateway nodes, when the messages from the compute nodes are received at greater than a predetermined rate.

19. The method of claim 1 additionally comprising:
at each of the compute nodes:

slowing a rate at which the messages are received from the gateway nodes, when the messages received from or to be sent from the compute nodes to the gateway nodes exceed a rate greater than a predetermined rate.

20. An electronic trading system comprising:
a plurality of gateway nodes configured to:

receive messages over one or more client connections, wherein the messages are electronic trading messages;

control a sustained flow rate and/or a burst flow rate of the messages on a per-client or per-connection basis; and forward the messages to a system-level node;

the system-level node configured to:

receive the messages from each of the gateway nodes;

control a system-wide message flow rate for the system, and further to control a sustained flow rate and/or a burst flow rate on a per-gateway-node-basis for each of the gateway nodes; and forward the messages to one or more compute nodes;

the one or more of the compute nodes configured to:

receive the messages from the system-level node; and operate on the messages to perform an electronic trading function;

a selected one of the compute nodes further configured to:

generate a response message; and return the response message to a selected one of the gateway nodes; and the selected one of the gateway nodes further configured to:

return the response message over at least one of the one or more client connections.

21. The method of claim 1 further comprising:
wherein controlling the system-wide message flow rate further comprises sending flow control messages from the system level node to the plurality of gateway nodes.

22. The method of claim 1 wherein
forwarding the messages to the system-level node further comprises forwarding the messages using a layered protocol; and receiving the messages from each of the plurality of gateway nodes further comprises receiving the messages using a layered protocol.

23. The method of claim 1 wherein
forwarding the messages to the compute nodes further comprises forwarding the messages using a layered protocol; and receiving the messages from the system level node further comprises receiving the messages using a layered protocol.

* * * * *